United States Patent
Tong et al.

(10) Patent No.: US 6,958,990 B1
(45) Date of Patent: Oct. 25, 2005

(54) CONTROLLING TRANSMIT DUTY CYCLE BY POSITION OF COVER

(75) Inventors: Chung Tong, Boynton Beach, FL (US); Gene Santana, Boca Raton, FL (US); Naveed Mirza, Boynton Beach, FL (US)

(73) Assignee: Motorola, Inc., Schaumburg, IL (US)

( * ) Notice: Subject to any disclaimer, the term of this patent is extended or adjusted under 35 U.S.C. 154(b) by 783 days.

(21) Appl. No.: 09/627,170

(22) Filed: Jul. 27, 2000

Related U.S. Application Data
(60) Provisional application No. 60/202,309, filed on May 5, 2000.

(51) Int. Cl.[7] ............................................. H04J 3/00
(52) U.S. Cl. ..................... 370/345; 370/347; 370/348
(58) Field of Search .............................. 370/352–346, 370/348, 311, 321, 337, 347, 442; 455/343.1, 343.2, 343.3, 343.4, 343.5, 343.6

(56) References Cited

U.S. PATENT DOCUMENTS

| | | | | |
|---|---|---|---|---|
| 5,603,081 A | * | 2/1997 | Raith et al. | 455/435.3 |
| 5,671,219 A | * | 9/1997 | Jensen et al. | 370/280 |
| 5,884,185 A | * | 3/1999 | Kim | 455/566 |
| 6,002,937 A | * | 12/1999 | Young et al. | 455/462 |
| 6,560,453 B1 | * | 5/2003 | Henry et al. | 455/67.11 |
| 6,744,808 B1 | * | 6/2004 | Walley et al. | 375/146 |

OTHER PUBLICATIONS

Digital Cellular Communications System (Phase 2+); Multiplexing and Multiple Access on the Radio Path (GSM 05.02 Version 6.5.0 Release 1997), published 1999 by the European Telecommunications Standards Institute, Valbonne, France.

* cited by examiner

*Primary Examiner*—Kenneth Vanderpuye
*Assistant Examiner*—Joshua Kading
(74) *Attorney, Agent, or Firm*—Michael Zazzara; Randi L. Karpinia

(57) ABSTRACT

A battery powered, portable, wireless communications transceiver device (10), has a housing (11) including a first portion (12) and a second portion (14). The device has a controller and a transmitter coupled to the controller. Using a digital, time-division multiple access protocol, the transmitter transmits messages comprised of packets. The first portion and the second portion are connected by a hinge (17) allowing the device to be put into an opened position or a closed position. The device has a sensor for detecting whether the housing is in an opened or in a closed position. The controller of the device receives a signal from the sensor regarding the position of the housing. The controller is programmable to respond to the position of the housing and to advantageously spread the transmission of packets of the message over a longer period than prior art methods, when the housing is in the closed position.

8 Claims, 3 Drawing Sheets though it has been shown to be a wireless communications transceiver device, or device, 10, has a housing 11 comprising a first portion 12 having a keyboard 13 and a second portion 14 having a display 15. The second portion 14 also has an antenna 16. Device 10 has a transmitter (not shown) preferably within the first portion 12. The transmitter is coupled to the antenna 16. The device 10 has a controller (not shown), preferably a microprocessor, coupled to the transmitter. The first portion 12 and the second portion 14 are mechanically connected by connection means, preferably a hinge 17. The second portion is movable into at least two positions, first position and a second position, relative to the first portion. The device 10 has a sensor, preferably an electromechanical sensor, (not shown) for detecting whether the housing is in an opened position (cover open) or in a closed position (cover closed). The sensor is coupled, preferably electrically, to the controller. Alternatively, the sensor is coupled, preferably electrically, directly to the transmitter. When the housing 11 is in the opened position as shown in FIG. 1, the keyboard 13 can be operated and the display 15 can be viewed. When the housing 11 is in the closed position as shown in FIG. 2, the keyboard 13 cannot be operated and the display 15 cannot be viewed. However, the transmitter can be actuated when the housing is in either the opened position or in the closed position. The controller controls the starting and the stopping of the transmitter, i.e., the transmit duty cycle of the transmitter, in accordance with the invention as set forth in more detail herein below.

CONTROLLING TRANSMIT DUTY CYCLE BY POSITION OF COVER

RELATED APPLICATION

This application is related to, and applicants hereby claim the benefit of the prior filing date of, co-pending provisional application No. 60/202,309, entitled "Controlling Transmit Duty Cycle by Position of Cover", filed May 5, 2000, by the identical inventors as the inventors of the present application, and which is hereby fully incorporated by reference herein.

FIELD OF THE INVENTION

This invention relates in general to portable, wireless communication devices, and more specifically controlling a duty cycle of the transmitter of a portable, wireless communication device.

BACKGROUND OF THE INVENTION

Controlling a duty cycle of a transmitter is generally known; but controlling the duty cycle of a transmitter of a portable, wireless, communications device, such as a pager or a cellular telephone, by a position of a cover or another part of the housing of the device is not known.

With portable, wireless communications devices having a cover, the immediate environment of the device is usually different depending upon whether the cover is in an opened position or in a closed position. When the cover is in the opened position, the device is usually being used; and, therefore, the immediate area around the device is clear, except for possibly being held in the a hand of a user. When the cover is in the closed position, the display and/or keyboard are not accessible to a user; and, therefore, the device is often in storage. The immediate area around the device when in storage is less likely to be clear of other objects; and, as a result of the other objects, the propagation of a signal transmitted by the device diminished. Often, the storage location, such as a mobile storage location, is only temporarily detrimental to propagation of transmitted radio signals.

For portable, wireless communications devices operating using a wireless, digital, time-division protocol, transmissions are made in one or more packets of information with each packet comprising a portion of a message. As a result, when the device in mobile storage location is temporarily in a weak signal condition, there is a great probability that, disadvantageously, none of the packets of information will be successfully transmitted. However, if the packets comprising a message were transmitted with a greater period of time between transmissions of packets, it is more likely that some of the packets would be successfully transmitted.

Thus, there is need to control the duty cycle in response to the position of the cover of the device, and thereby, indirectly, to control the duty cycle of the device when the device is likely to be in a storage location, in order to increase the probability that at least some of the packets be successfully transmitted.

DESCRIPTION OF A PREFERRED EMBODIMENT

Figure 1:
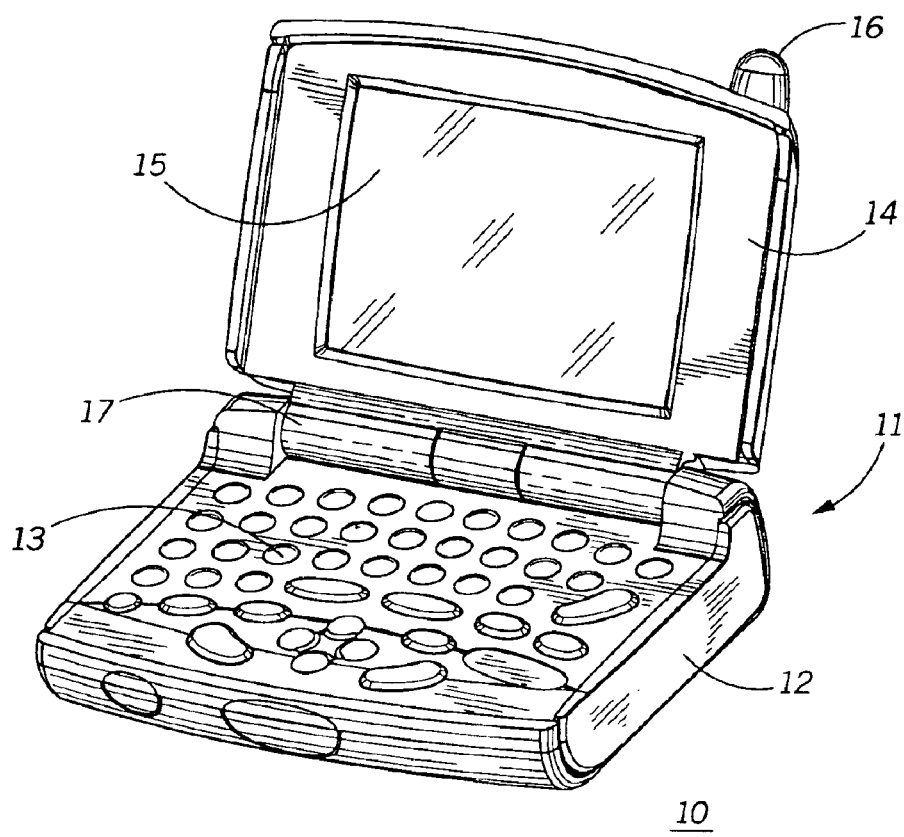
FIG. 1 is a perspective view of a battery powered, portable, wireless communications transceiver device in accordance with the invention, with a cover in an opened position.
Figure 2:
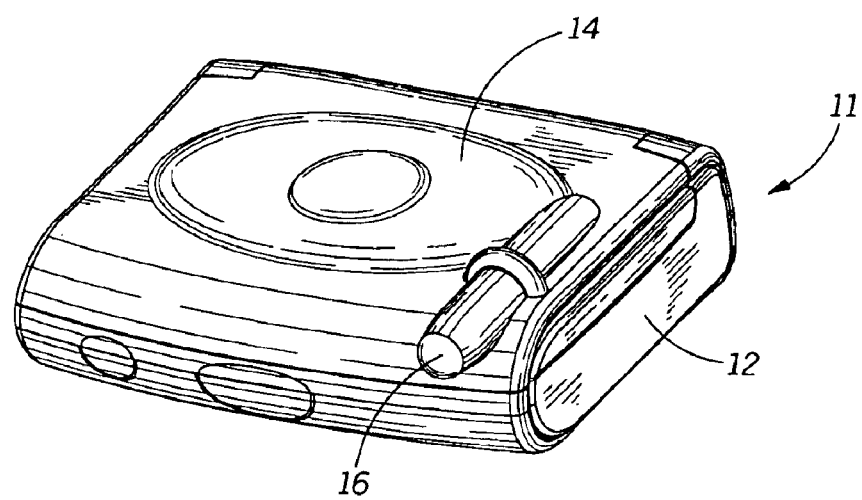
FIG. 2 is a perspective view of the device of FIG. 1, with the cover in a closed position.

Referring to FIG. 1, a battery powered, portable, wireless

Figure 3:
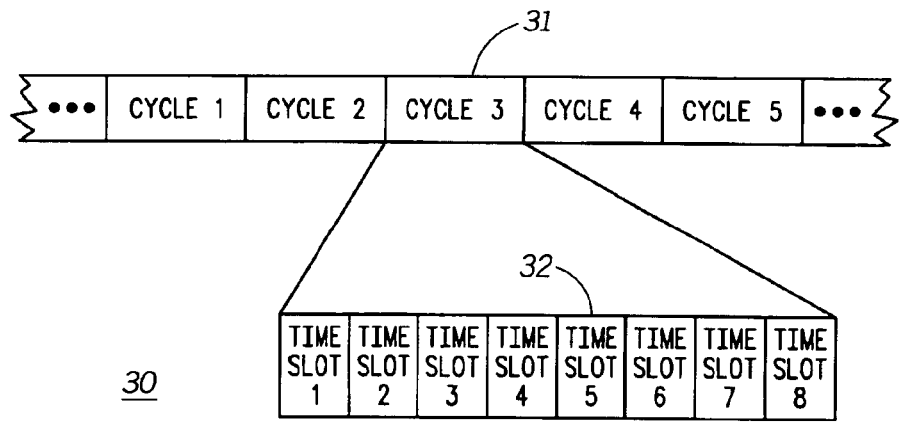
FIG. 3 is a timing diagram illustrating the transmission format of a wireless, digital, time-division protocol utilized by the device of FIG. 1 in accordance with the preferred embodiment of the present invention.

FIG. 3 is a timing diagram 30 illustrating the transmission format of a wireless, digital, time-division protocol utilized by the device 10 in accordance with the preferred embodiment of the present invention. The device 10 operates using a wireless, digital, time-division protocol, preferably the Global System for Mobile Applications (GSM) protocol, or the Time Division Multiple Access (TDMA) protocol. The GSM protocol has eight time slots 32 per cycle 31 with each time slot having a duration of 577 microseconds. One version of the TDMA protocol has six time slots per cycle with each time slot having a duration of 6.56 milliseconds. In both protocols, the transmission rate varies from four to thirteen kilobits per second. The GSM and TDMA protocols are more fully described in *Digital Cellular Communications System (Phase 2+); Multiplexing and Multiple Access on the Radio Path* (GSM 05.02 Version 6.5.0 Release 1997), published, 1999, by the European Telecommunications Standards Institute, Valbonne, France, which is hereby fully incorporated by reference herein.

Wireless transmissions of a message by (i.e., from) the device are made in one or more packets of information. When a message is transmitted in more than one packet, each packet comprises a portion of the message. Typically, shorter messages are transmitted entirely in one packet, and longer messages are transmitted in more than one packet. However, any message greater than one bit in size can, in general, be transmitted using more than one packet.

Figure 4:
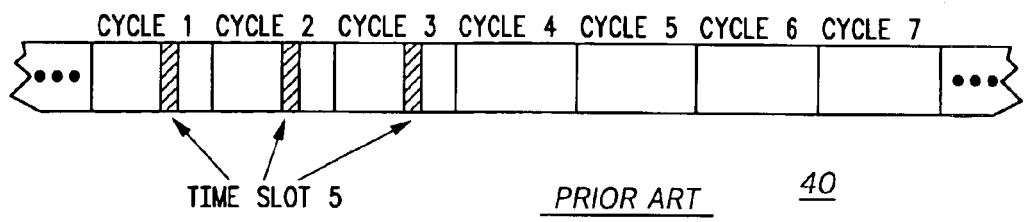
FIG. 4 is a timing diagram illustrating the use of the protocol of FIG. 3 utilized by the device of FIG. 1 in accordance with the prior art.

FIG. 4 is a timing diagram 40 illustrating the use of the protocol utilized by the device 10 in accordance with the prior art. When, because of the size of a relatively large (i.e., long) message, the entire message cannot be transmitted within a single time slot, prior art methods transmit packets of the message in an assigned time slot in adjacent cycles of the protocol until the entire message is transmitted. For example, prior art devices would transmit packets of the message in time slot #5 of every cycle, without skipping any cycle, until the entire message is transmitted. Therefore, prior art devices transmits the message over a relatively short period, and prior art devices have no capability to spread the transmission of the message over a longer period. The device 10 in accordance with the invention allows the aforesaid prior art method to be used, if the housing is in the opened position. However, unlike the prior art, the device 10 in accordance with the invention can spread the transmission of the packets of the message over a relatively long period, if the housing is in the closed position.

Figure 5:
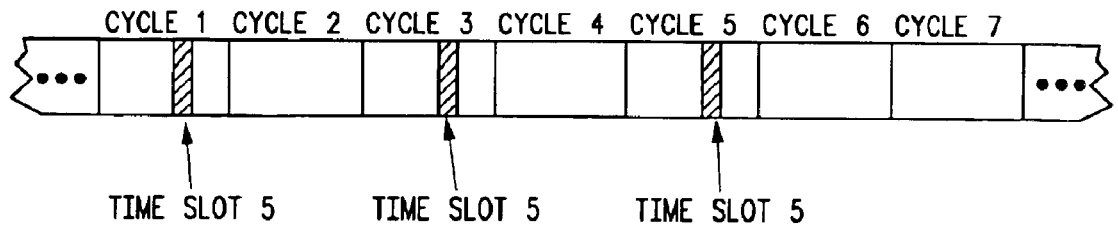
FIG. 5 is a timing diagram illustrating the use of the protocol of FIG. 3 utilized by the device of FIG. 1 in accordance with the preferred embodiment of the present invention.

FIG. 5 is a timing diagram 50 illustrating a first example of the use of the protocol utilized by the device 10 in accordance with the preferred embodiment of the present invention. When, because of the size of a relatively large (i.e., long) message, the entire message cannot be transmitted within a single time slot, the device 10 in accordance with the invention advantageously transmits packets of the message in an assigned time slot in non-adjacent cycles of the protocol until the entire message is transmitted, if the housing is in the closed position. In this first example, the device transmits packets of the message in time slot #5 of every other cycle, i.e., the device skips a cycle, until the entire message is transmitted. FIG. 5 shows the transmission of packets in time slot #5 of cycle #1, cycle #3 and cycle #5 of the protocol. FIG. 5 is a simplification for purposes of illustration. The transmission of packets also occurs in succeeding odd-numbered cycles until the entire message is transmitted. The invention is not limited to starting transmissions in slot #1 of a cycle; nor is the invention limited to using odd numbered time slots.

As an alternative example (not shown), the device 10 in accordance with the invention transmits packets of the message in time slot #5 of every third cycle, i.e., the device skips two cycles, until the entire message is transmitted. This method can be generalized to transmitting every $n^{th}$ cycle. The controller of the device receives a signal from the sensor regarding the position (opened or closed) of the housing 11. The controller is programmable as to whether it responds to the position of the housing 11 and therefore advantageously spreads the transmission of a message over a longer period than prior art methods, or whether it ignores the position of the housing and always transmits a message over a shortest possible period as in the prior art method, regardless of the position of the housing. The controller is also programmable with regard to the value of n. The controller is programmable through use of the keyboard 13.

Figure 6:
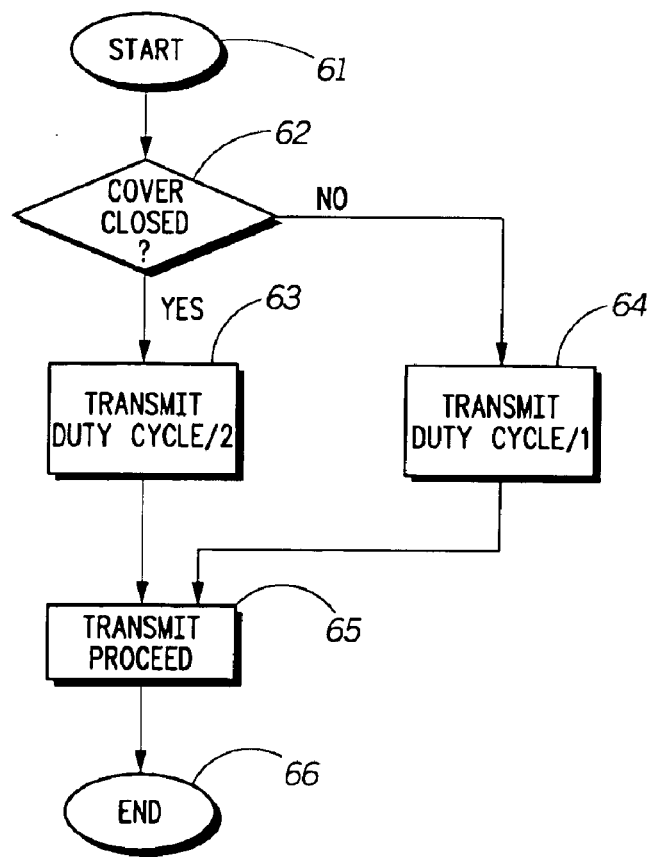
FIG. 6 is a flow diagram showing steps executed by the device of FIG. 1 with regard to controlling the duty cycle in accordance with the preferred embodiment of the present invention.

FIG. 6 is a flow diagram 60 showing a specific example of the steps of a method executed by the controller of the device 10 in accordance with the invention, when n=2. The method starts at step 61. At step 62, the controller determines whether the housing is closed. If the housing is closed, then, at step 63, the controller sets the device to a pre-set transmit duty cycle of "transmit duty cycle/2", which is pre-stored in the device. At step 65, the controller causes the transmitter to operate in accordance with the invention, i.e., increasing the period over which a relatively longer message is transmitted. The transmit duty cycle of "transmit duty cycle/2" means that the device doubles the period over which a relatively longer message is transmitted, and that the device transmits packets of the message in a same-numbered time slot of every other cycle, i.e., the device skips a cycle between transmissions, until the entire message is transmitted, similar to the first example, above (see FIG. 5).

On the other hand, if, at step 62, the controller determined that the housing not closed, i.e., is opened, then, at step 64, the controller sets the device to a pre-set transmit duty cycle of "transmit duty cycle/1", which is also pre-stored in the device, and, in such case, at step 65, the controller causes the transmitter to operate in the prior art mode. In either case, the method ends at step 66 after transmissions of all the packets of the message.

The invention is not limited to controlling the transmit duty cycle by the position of the cover of the device 10, but is equally applicable to controlling the transmit duty cycle by a relative position of any portion of the housing 11 of the device relative to another portion of the housing of the device. Furthermore, the invention is not limited to controlling the transmit duty cycle by the relative position of any portion of the housing 11 of the device 10 relative to another portion of the housing of the device, but is equally applicable to controlling the transmit duty cycle based upon whether the device is in a storage location, such as whether the device is in a holster or case.

Advantageously, the transmitter of the device 10 in accordance with the invention rests during all time slots of one or more cycles between the cycles during which the device does transmit. A device in accordance with the invention has the advantage of allowing the battery that powers the device to last longer, and also has the advantage that at least some of packets of a message will be successfully transmitted when the device is in locations of poor transmission, because the probability that the device would be moved between transmissions increases as the interval between transmission of packets increases.

While a detailed description of the preferred embodiments of the invention has been given, it should be appreciated that many variations can be made thereto without departing from the scope of the invention as set forth in the appended claims. For example, the invention is not limited to being used with the Global System for Mobile Applications (GSM) protocol, or the Time Division Multiple Access (TDMA) protocol, but can be used with other time-division protocols. The invention is not limited to controlling the transmit duty cycle by the position of the cover, or flip, of the device, but can be extended to controlling the transmit duty cycle based upon other criteria to determine whether radio signals cannot propagate from the device as readily as when the device in a clear, or open, location.

We claim:

1. A wireless device for transmitting packets of a message during an assigned time slot of cycles of a time-division protocol, comprising:

a housing, the housing having a first position and a second position;

a controller within the housing, the controller adapted to associate a first transmit duty cycle with the first position and a second transmit duty cycle with the second position, wherein the first transmit duty cycle comprises message packet transmission in the assigned time slot of adjacent cycles of the protocol, and wherein the second transmit duty cycle comprises message packet transmission in the assigned time slot of at least every $2^{nd}$ cycle of the protocol; and a transmitter coupled to the controller, the controller adapted to cause the transmitter to operate at the first transmit duty cycle when the housing is in the first position and to operate at the second transmit duty cycle when the housing is in the second position.

2. A device for transmitting packets of a message during an assigned time slot of cycles of a time-division protocol, comprising:

a housing, the housing having at least two portions, the at least two portions being movable to each other into a first position and a second position;

a controller within the housing, the controller adapted to associate a first transmit duty cycle with the first position and a second transmit duty cycle with the second position, wherein the first transmit duty cycle comprises message packet transmission in the assigned time slot of adjacent cycles of the protocol, and wherein the second transmit duty cycle comprises message packet transmission in the assigned time slot of at least every $2^{nd}$ cycle of the protocol; and a transmitter coupled to the controller, the controller adapted to cause the transmitter to operate at the first transmit duty cycle when the at least two portions of housing are in the first position and to operate at the second transmit duty cycle when the at least two portions of housing are in the second position.

3. The device of claim 2, including a keyboard, and in which the controller is programmable through use of the keyboard.

4. The device of claim 2, including a sensor coupled to the housing, and to the controller and in which the sensor detects the position of the housing.

5. The device of claim 4, in which the controller receives a signal from the sensor regarding the position of the housing.

6. In a device having a transmitter and a housing, the housing comprised of two or more portions, at least one portion of the two or more portions movable into a plurality of positions, a method of controlling a transmit duty cycle of the transmitter by a position of the at least one portion of the two or more portions of the housing, comprising the steps of:

storing in the device a plurality of transmit duty cycles of the transmitter, a first transmit duty cycle associated with a first position of the plurality of positions of the at least one portion of the two or more portions of the housing, a second transmit duty cycle associated with a second position of the plurality of positions of the at least one portion of the two or more portions of the housing, wherein the first transmit duty cycle comprises message packet transmission in the assigned time slot of adjacent cycles of the protocol, and wherein the second transmit duty cycle comprises message packet transmission in the assigned time slot of at least every 2nd cycle of the protocol;

determining a current position is the first position of the at least one portion of the two or more portions of the housing;

in response to the first position, setting the transmitter to operate at the first transmit duty cycle;

changing the position of the at least one portion of the two or more portions of the housing to the second position; and in response to the second position, setting the transmitter to operate at the second transmit duty cycle.

7. The method of claim 6, including the step of transmitting at the first transmit duty cycle of the transmitter prior to the changing step; and transmitting at the second transmit duty cycle of the transmitter after the step of setting the transmitter to operate at the second transmit duty cycle.

8. In a device having a transmitter and a housing, the housing comprised of two or more portions, the portions capable of being moved into more than one position relative to each other, a method comprising the steps of:

storing in the device a plurality of transmit duty cycles of the transmitter, a first stored transmit duty cycle associated with a first position, a second stored transmit duty cycle associated with a second position, wherein the first transmit duty cycle comprises message packet transmission in the assigned time slot of adjacent cycles of the protocol, and wherein the second transmit duty cycle comprises message packet transmission in the assigned time slot of at least every $2^{nd}$ cycle of the protocol;

determining a current position of the portions is the first position;

in response to the first position, setting the transmitter to operate at the first stored transmit duty cycle;

transmitting at the first transmit duty cycle;

changing the current position of the portions to the second position;

in response to the second position, setting the transmitter to operate at the second stored transmit duty cycle; and transmitting at the second transmit duty cycle.

\* \* \* \* \*